US008682955B1

(12) United States Patent
Monden et al.

(10) Patent No.: US 8,682,955 B1
(45) Date of Patent: Mar. 25, 2014

(54) FULLY AUTOMATED CLOUD TIERING CONTROLLED BY AN ORCHESTRATION LAYER BASED ON DYNAMIC INFORMATION

(75) Inventors: Jason Monden, Trophy Club, TX (US); Matt Waxman, Waltham, MA (US)

(73) Assignee: EMC Corporation, Hopkinton, MA (US)

( * ) Notice: Subject to any disclaimer, the term of this patent is extended or adjusted under 35 U.S.C. 154(b) by 427 days.

(21) Appl. No.: 12/930,249

(22) Filed: Dec. 31, 2010

(51) Int. Cl.
*G06F 3/00* (2006.01)
*G06F 15/16* (2006.01)

(52) U.S. Cl.
USPC .............................. 709/201; 709/217; 710/39

(58) Field of Classification Search
None
See application file for complete search history.

(56) References Cited

U.S. PATENT DOCUMENTS

| | | | |
|---|---|---|---|
| 5,742,792 | A | 4/1998 | Yanai et al. |
| 7,266,706 | B2 | 9/2007 | Brown et al. |
| 7,577,722 | B1 | 8/2009 | Khandekar et al. |
| 7,822,939 | B1 | 10/2010 | Veprinsky et al. |
| 7,836,018 | B2 | 11/2010 | Oliveira et al. |
| 2006/0031450 | A1 | 2/2006 | Unrau et al. |
| 2006/0069887 | A1 | 3/2006 | LeCrone et al. |
| 2008/0215450 | A1* | 9/2008 | Gates et al. ................... 705/26 |
| 2009/0070541 | A1 | 3/2009 | Yochai et al. |
| 2009/0112789 | A1 | 4/2009 | Oliveira et al. |
| 2009/0112811 | A1 | 4/2009 | Oliveira et al. |
| 2009/0112880 | A1 | 4/2009 | Oliveira et al. |
| 2009/0112921 | A1 | 4/2009 | Oliveira et al. |
| 2011/0231477 | A1* | 9/2011 | Safruti et al. ................. 709/203 |
| 2011/0282975 | A1* | 11/2011 | Carter ........................... 709/220 |

OTHER PUBLICATIONS

U.S. Appl. No. 12/653,981, filed Dec. 18, 2009, Gong et al.
U.S. Appl. No. 12/924,345, filed Sep. 24, 2010, Burke et al.
J. Matthews et al.; "Virtual Machine Contracts for Datacenter and Cloud Computing Environments," ACDC'09, Jun. 19, 2009, Barcelona, Spain, 6 pp.
W. Zeng et al., "Cloud Service and Service Selection Algorithm Research," GEC '09, Jun. 12-14, 2009, Shanghai, China, pp. 1045-1048.
"Architectural Strategies for Cloud Computing," Oracle White Paper in Enterprise Architecture, Aug. 2009, 18 pp.
"VMware Virtual Machine File System: Technical Overview and Best Practices," VMware Technical White Paper, Version 1.0, WP-022-PRD-01-01, 2007, 19 pp.
"IT in the Cloud: Using VMware vCloud for Reliable, Flexible, Shared IT Resources," VMware White Paper, 2008, 8 pp.

(Continued)

*Primary Examiner* — Idriss N Alrobaye
*Assistant Examiner* — Richard B Franklin
(74) *Attorney, Agent, or Firm* — Muirhead and Saturnelli, LLC

(57) ABSTRACT

A distributed storage system includes an orchestration layer that provides policy driven orchestration for controlling access and/or load balancing in connection with servicing I/O requests from one or hosts at one or more compute sites in a cloud configuration. The I/O requests may be received over a communication link, and the orchestration layer maintain policies and/or other information that control the selection of an compute site for processing of the I/O according to one or more policies and based on tiering designations of the compute sites. For example, according to various embodiments, policy information of the orchestration layer may control the passing of I/O requests to the one or more compute sites with respect to such factors as requirements of particular service legal agreements, specific tolerances for handling the I/O requests and/or times and rates for processing I/O requests at particular compute sites.

17 Claims, 6 Drawing Sheets

(56) References Cited

OTHER PUBLICATIONS

"VMware vSphere, the First Cloud Operating System, Provides an Evolutionary, Non-disruptive Path to Cloud Computing," VMware White Paper, 2009, 8 pp.

"EMC Symmetrix VMAX and VMware Virtual Infrastructure: Applied Technology," EMC Corporation, White paper, May 2010, 44 pp.

"Using VMware Virtualization Platforms with EMC VPLEX: Best Practices Planning," EMC Corporation, White paper, Aug. 2010, 45 pp.

"Workload Resiliency with EMC VPLEX: Best Practices Planning," EMC Corporation, White paper, May 2010, 19 pp.

"Implementation and Planning Best Practices for EMC VPLEX," EMC Corporation, Technical Notes, Oct. 25, 2010, 37 pp.

D. Leijen et al., "Parallel Performance: Optimize Managed Code for Multi-Core Machines," MSDN Magazine, Oct. 2007, 11 pp.

* cited by examiner

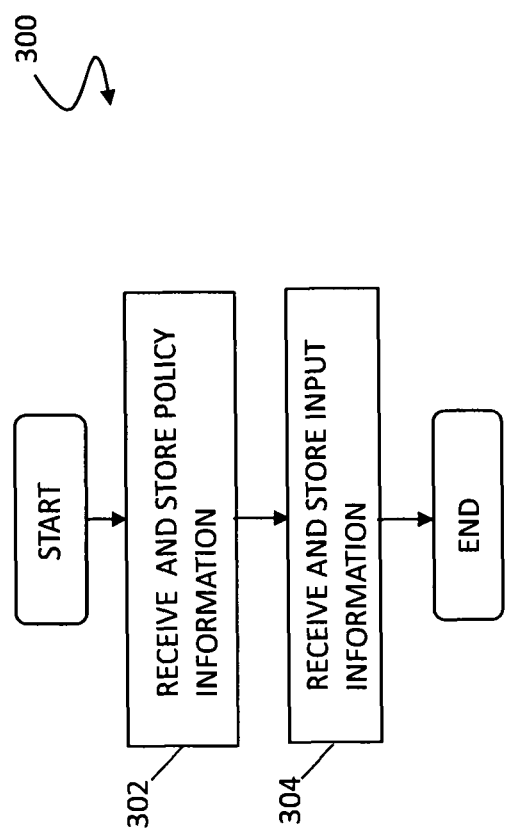

FULLY AUTOMATED CLOUD TIERING CONTROLLED BY AN ORCHESTRATION LAYER BASED ON DYNAMIC INFORMATION

TECHNICAL FIELD

This application is related to the field of data storage and, more particularly, to systems for managing data sharing on a storage network.

BACKGROUND OF THE INVENTION

In current storage networks, and particularly storage networks including geographically remote access nodes and storage resources, preserving or reducing bandwidth between resources and access nodes is highly desirable as well as providing optimized data availability and access. Data access may be localized, in part to improve access speed to pages requested by host devices. Caching data at access nodes provides localization, however, it is desirable that the cached data be kept coherent with respect to modifications at other access nodes that may be caching the same data. An example of a system for providing distributed cache coherence is described in U.S. Patent App. Pub. No. 2006/0031450 to Unrau et al., entitled "Systems and Methods for Providing Distributed Cache Coherency," which is incorporated herein by reference. Other systems and techniques for managing and sharing storage array functions among multiple storage groups in a storage network are described, for example, in U.S. Pat. No. 7,266,706 to Brown et al. entitled "Methods and Systems for Implementing Shared Disk Array Management Functions," which is incorporated herein by reference.

Fully automated storage tiering (FAST) is a technology that provides for the automated storage and movement of data according to characteristics of the data, such as frequency of use, time of last use of the data, and/or user information associated with the data, among other characteristics. Data may be automatically moved between different storage areas or tiers periodically and/or after a trigger event according to various policies based on the data characteristics, for example. A FAST system may operate in connection with thin or virtual provisional technologies in which a storage system presents a large amount of storage capacity to a host, but consumes space only as needed from a shared pool. With thin provisioning, the host visible capacity (e.g., storage perceived by the applications) may be larger than the actual allocated space on the storage system. For discussions of various automated storage tiering systems, including the use of thin provisioning, see, for example, U.S. Patent App. Pub. No. 2009-0070541 to Yochai, entitled "Automated information lifecycle management with thin provisioning" and U.S. Pat. No. 7,822,939 to Veprinsky, et al., entitled "Data de-duplication using thin provisioning," which are both incorporated herein by reference.

Additionally, cloud computing technologies may provide for the use of online compute and storage services to execute applications in a virtual environment and in which resources may be efficiently allocated to provide on-demand compute and storage capacity over a network infrastructure. For discussions of systems and techniques for online services to provide on-demand data storage functions, see, for example, U.S. Pat. No. 7,836,018, entitled "Simultaneously accessing file objects through web services and file services;" US Patent App. Pub. No. 2009-0112811, entitled "Exposing Storage Resources with Differing Capabilities;" US Patent App. Pub. No. 2009-0112921, entitled "Managing Files Using Layout Storage Objects;" US Patent App. Pub. No. 2009-0112880, entitled "Managing File Objections in a Data Storage System;" and US Patent App. Pub. No. 2009-0112789, entitled "Policy Based File Management," all to Oliveira, et al. and which are all hereby incorporated by reference.

It is noted that various issues may occur in connection with the management of resources using technologies like that discussed above. In particular, for example, policies, such as service level agreements (SLAs) between clients and service providers, may cause issues involving, for example, access times, processing costs and load balancing requirements among multiple data centers that are geographically dispersed and subject to varying levels of access demands depending on particular locations and/or particular times.

Accordingly, it would be desirable to provide an system that efficiently and effectively manages distributed storage to address issues like that noted above, particularly for a system in which resources are geographically dispersed.

SUMMARY OF THE INVENTION

According to the system described herein, a method for managing I/O request processing includes receiving an I/O request. Policy information is maintained at an orchestration layer that is coupled to a plurality of compute sites that service I/O requests, in which the policy information affects servicing of the I/O request. Using the policy information of the orchestration layer, at least one of the plurality of compute sites to service the I/O request is determined. Servicing of the I/O request at the at least one compute site is orchestrated based on the policy information. The policy information may include dynamically updated information. The policy information may include (i) rate information for processing resources at the plurality of compute sites and/or (ii) information corresponding to a service level agreement between a customer and a service provider. The plurality of compute sites may be located geographically distant from each other and the determining the at least one of the plurality of compute sites to service the I/O request may include basing the determining on policy information that corresponds to a local time at the at least one of the plurality of compute sites. Servicing of the I/O request at the at least one of the plurality of compute sites may be transparent to a host that sends the I/O request. The method may further include receiving the policy information at the orchestration layer from an interface which may include an application programming interface and/or a graphical user interface.

According further to the system described herein, a computer readable medium stores computer software for managing I/O request processing. The computer software may include executable code that receives an I/O request. Executable code may be provided that maintains policy information at an orchestration layer that is coupled to a plurality of compute sites that service I/O requests, in which the policy information affects servicing of the I/O request. Executable code may be provided that determines, using the policy information of the orchestration layer, at least one of the plurality of compute sites to service the I/O request. Executable code may be provided that orchestrates servicing of the I/O request at the at least one compute site based on the policy information. The policy information may include dynamically updated information. The policy information may include (i) rate information for processing resources at the plurality of compute sites and/or (ii) information corresponding to a service level agreement between a customer and a service provider. The plurality of compute sites may be located geographically distant from each other. The executable code that determines the at least one of the plurality of compute sites to service the I/O request may include executable code that bases the determination on policy information that corresponds to a local time at the at least one of the plurality of compute sites. Servicing of the I/O request at the at least one of the plurality of compute sites may be transparent to a host that sends the I/O request. Executable code may be provided that receives the policy information at the orchestration layer from an interface which may include an application programming interface and/or a graphical user interface.

According further to the system described herein, a system for managing I/O request processing includes a plurality of compute sites that are connected and an orchestration layer that is coupled to the plurality of compute sites. The orchestration layer may include a computer readable medium storing computer software for managing I/O request processing. The computer software may include executable code that maintains policy information at the orchestration layer that affects servicing of an I/O request received for processing at the plurality of compute sites. Executable code may be provided that maintains policy information at the orchestration layer, in which the policy information affects servicing of the I/O request. Executable code may be provided that determines, using the policy information of the orchestration layer, at least one of the plurality of compute sites to service the I/O request. Executable code may be provided that orchestrates servicing of the I/O request at the at least one compute site based on the policy information. The plurality of compute sites may be located geographically distant from each other. The executable code that determines the at least one of the plurality of compute sites to service the I/O request may include executable code that bases the determination on policy information that corresponds to a local time at the at least one of the plurality of compute sites. Executable code may be provided that receives the policy information at the orchestration layer from an interface.

BRIEF DESCRIPTION OF THE DRAWINGS

Embodiments of the system described herein are explained with reference to the several figures of the drawings, which are briefly described as follows.

FIG. 6 is a flow diagram showing policy and input processing by the orchestration layer according to an embodiment of the system described herein.

DETAILED DESCRIPTION OF VARIOUS EMBODIMENTS

Figure 1:
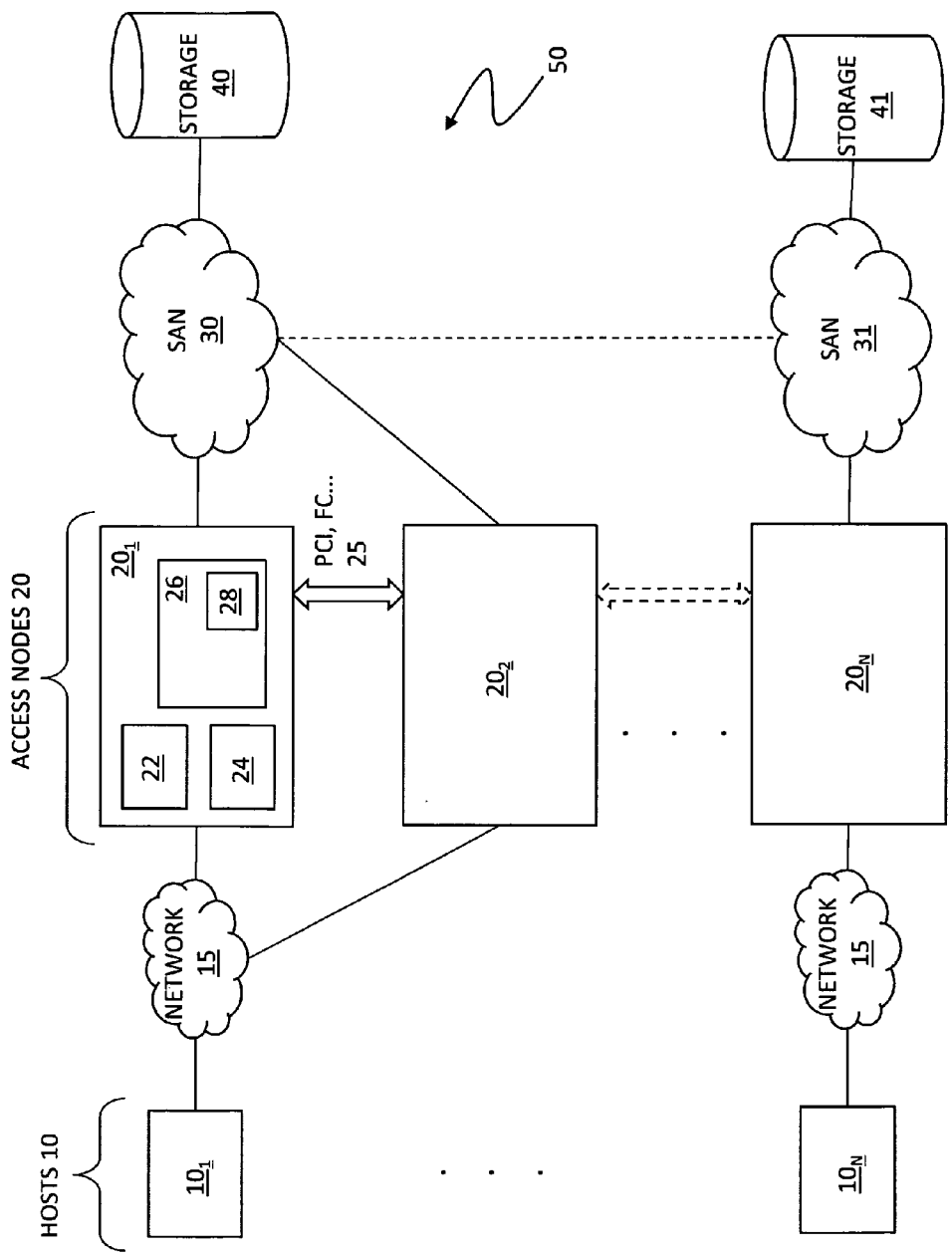
FIG. 1 shows a network configuration that may be used in accordance with an embodiment of the system described herein.

FIG. 1 shows a basic network configuration 50 that may be used in accordance with an embodiment of the system described herein. As shown, a plurality of host devices 10 ($10_1$ to $10_N$) are communicably coupled with a plurality of access nodes 20 ($20_1$, $20_2$ to $20_N$). Each of the access nodes 20 may include a processor (CPU) component 22, such as a microprocessor or other intelligence module, a cache component 24 (e.g., RAM cache), an instance of a directory manager 26 and/or other local storage and communication ports. (In general, "N" is used herein to indicate an indefinite plurality, so that the number "N" when referred to one component does not necessarily equal the number "N" of a different component. For example, the number of hosts 10 does not, but may, equal the number of access nodes 20 in FIG. 1.) Cache memory may be considered memory that is faster and more easily accessible by a processor than other non-cache memory used by a device.

Each of the hosts 10 may be communicably coupled to one or more of access nodes 20 over one or more network connections 15. It is noted that host devices 10 may be operatively coupled with access nodes 20 over any of a number of connection schemes as required for the specific application and geographical location relative to each of the access nodes 20, including, for example, a direct wired or wireless connection, an Internet connection, a local area network (LAN) type connection, a wide area network (WAN) type connection, a VLAN, a proprietary network connection, etc.

Each of the access nodes 20 may also include, or be communicably coupled with, one or more array management functions (AMFs), and may be communicably coupled with one or multiple storage resources 40, 41, each including one or more disk drives and/or other storage volume, over one or more storage area networks (SANs) 30, 31 and/or other appropriate network, such as a LAN, WAN, etc. The access nodes 20 may be located in close physical proximity to each other or one or more may be remotely located, e.g., geographically remote, from other access nodes. Each of the access nodes 20 may also be able to intercommunicate with other access nodes over an IP network, a peripheral component interconnected (PCI) bus and/or a Fibre channel (FC) network 25, over the network 15 and/or over the SANs 30, 31. Several of the access nodes 20 may be grouped together at one or more sites in connection with the multiple storage resources 40, 41 and in which the sites are geographically distant from one another. The SANs 30, 31 may be separate networks located at the geographically distant locations. Alternatively, in an embodiment, the SANs 30, 31 may optionally be coupled to one another, as schematically illustrated by a dashed line connecting the SANs 30, 31.

Each directory manager 26 may be responsible for providing coherence mechanisms for shared data across a distributed set of access nodes. The set of access nodes that are caching data from a shared data volume may be called a share group. In general, the directory manager 26 may include a module with software executing on a processor or other intelligence module (e.g., ASIC) in an access node. The directory manager 26 may be implemented in a single access node or distributed across multiple intercommunicating access nodes. In certain aspects, each of the nodes 20 may be embodied as a controller device, or blade, communicably coupled to the storage network 30 that allows access to data stored on the storage network. However, it may be appreciated that an access node may also be embodied as an intelligent fabric switch, a hub adapter and/or other appropriate network device. Because Locality Conscious Directory Migration (LCDM) is applicable to databases, any suitable networked compute node may be configured to operate as an access node with directory manager functionality. For example, a directory manager may be run on a desktop computer with a network connection.

Figure 2:
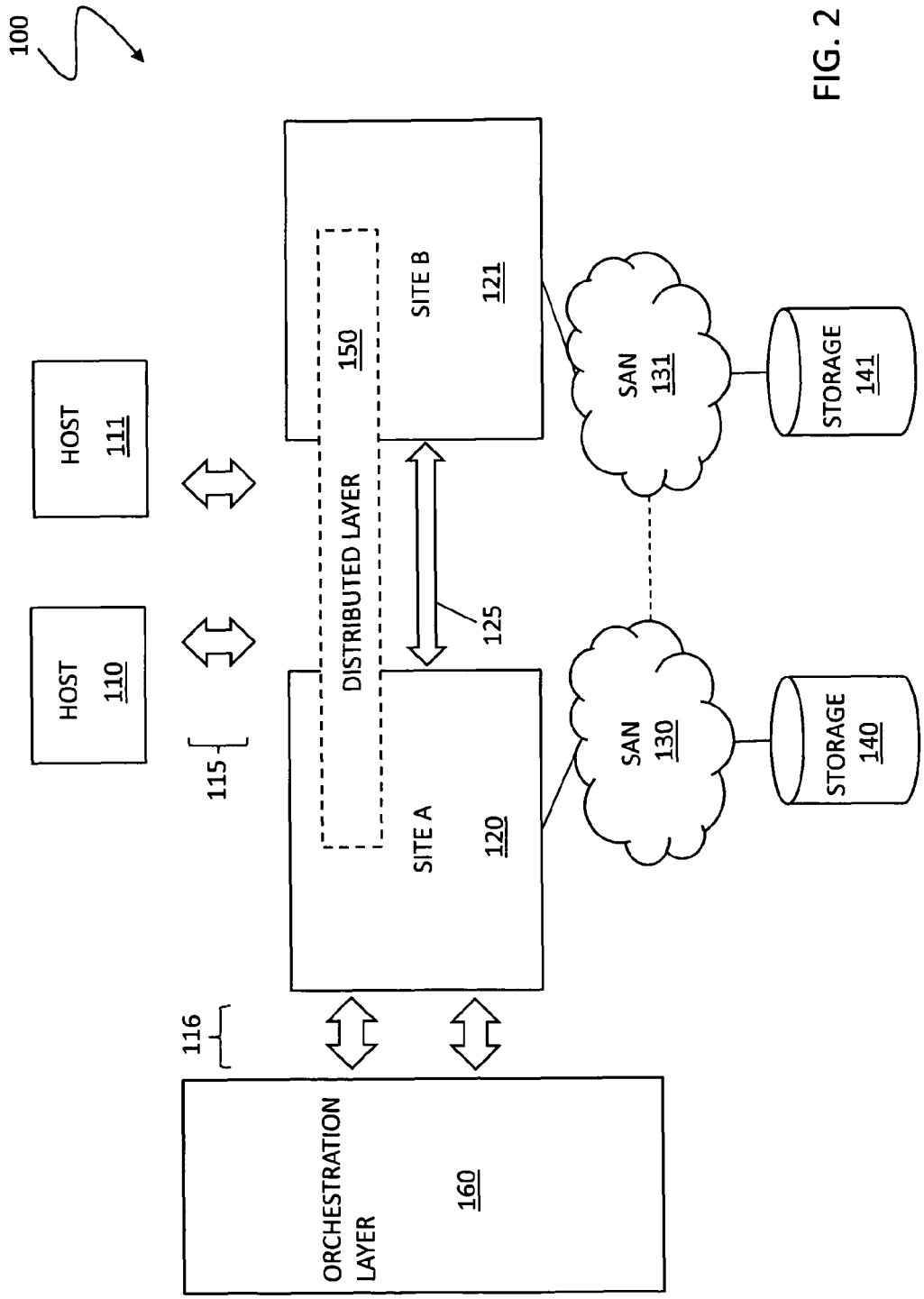
FIG. 2 is a schematic illustration showing a distributed storage system according to an embodiment of the system described herein.

FIG. 2 is a schematic illustration showing a distributed storage system 100 according to an embodiment of the system described herein. The system may include a collection of multiple compute sites, such as site A 120 and site B 121, that may each include one or more access nodes like the access nodes 20 discussed elsewhere herein. Although two compute sites are shown, more than two compute sites may be used and operated in connection with the system described herein. As further discussed elsewhere herein, the sites 120, 121 may be located geographically distant from each other. In an embodiment, the distributed storage system 100 may operate in an active/active mode in which multiple sites may provide mirroring for at least some of the data and may handle processing of host read/write I/O requests. The sites 120, 121 may be connected via an interconnection 125, such as an IP network, PCI bus, FC network and/or any other type of network. Hosts 110, 111 are shown that may communicate with the compute sites 120, 121, as further discussed elsewhere herein. The hosts 110, 111 may be representative of any number of hosts that may perform I/O access operations in the distributed storage system 100.

The multiple compute sites 120, 121 may together be engaged in a joint operations in connection with I/O requests of one or more hosts like the host 110. The joint operations may include facilitating data mirroring (including possibly allowing write access to multiple sites) as well as managing access to the mirrored data, for example, in connection with data mirroring operations, for example, like that provided by a Remote Data Facility (RDF) storage product produced by EMC Corporation of Hopkinton, Mass., such as a Symmetrix product and/or a Clariion product. For further discussion of RDF and the use thereof in data recovery and storage techniques, see, e.g., U.S. Pat. No. 5,742,792 to Yanai et al. entitled "Remote Data Mirroring," and U.S. Patent App. Pub. No. 2006-0069887 to LeCrone et al., entitled "Triangular Asynchronous Replication," which are incorporated herein by reference.

The sites 120, 121 may be coupled via SANs 130, 131 to storage resources 140, 141. The storage resources 140, 141 may be located in proximity to the sites 120, 121 and/or may be remotely located and accessed. In an embodiment, the SANs 130, 131 may be separate networks. Alternatively, in another embodiment, the SANs 130, 131 may be part of the same network, an embodiment shown represented by a dashed line connecting the SANs 130, 131. In various embodiments, the joint operations may include multiple, independent sub-computations and may include operations of a clustered small computer system interface (SCSI) device corresponding to use of external storage nodes that may be accessed by one or more of the sites 120, 121.

A distributed layer 150 is shown schematically as a system of the sites 120, 121 that may be distributed across the sites 120, 121 in connection with processing of one or more access nodes. In a virtualization environment, the distributed layer 150 may function like a virtual center that provides for control of managing, monitoring, provisioning and migrating virtual machines A virtual machine is a software implementation of a machine that executes programs like a physical machine. The virtual center may provide for managing deployment of virtual machines at one or more data centers, like the sites 120, 121, and may operate to control virtual machines at the sites 120, 121 in connection with cloud computing including both internal and external cloud infrastructures and hybrids thereof. Configuring and deploying virtual machines is known in the field of computer science. For example, U.S. Pat. No. 7,577,722 to Khandekar, et al., entitled "Provisioning of Computer Systems Using Virtual Machines," which is hereby incorporated by reference, discloses techniques for configuring and deploying a virtual machine according to user specifications. The system described herein may operate in connection with a VPLEX product produced by EMC Corporation of Hopkinton, Mass. that may provide a distributed software layer operating in a virtualization environment.

According to the system described herein, an orchestration layer 160 may be provided that provides policy driven orchestration for controlling access and/or load balancing in connection with servicing I/O requests among the sites 120, 121 in a cloud computing environment. I/O requests from the hosts 110, 111 may be received by one or more of the sites 120, 121 over a communication link 115 that may be a network, such as the Internet and/or other suitable communication link. The orchestration layer 160 may be coupled to the sites 120, 121, including the distributed layer 150, via a communication link 116 that may be the same as or a different network than the communication link 115. The orchestration layer 160 may control and implement policies and/or other information for the servicing I/O requests at one or more of the sites 120, 121, as further discussed elsewhere herein. In various embodiments, the orchestration layer 160 may be a software layer that is distributed across the sites 120, 121 like the distributed layer 150 and/or may be integrated in connection with an independent compute entity coupled to the sites 120, 121. The orchestration layer 160 orchestrates, based, for example, on policies and/or other information fed from manual and dynamic inputs, where compute and storage processes may reside and provides non-disruptive control for the servicing of I/O requests that is fully enabled by a dynamic active/active storage platform.

Figure 3:
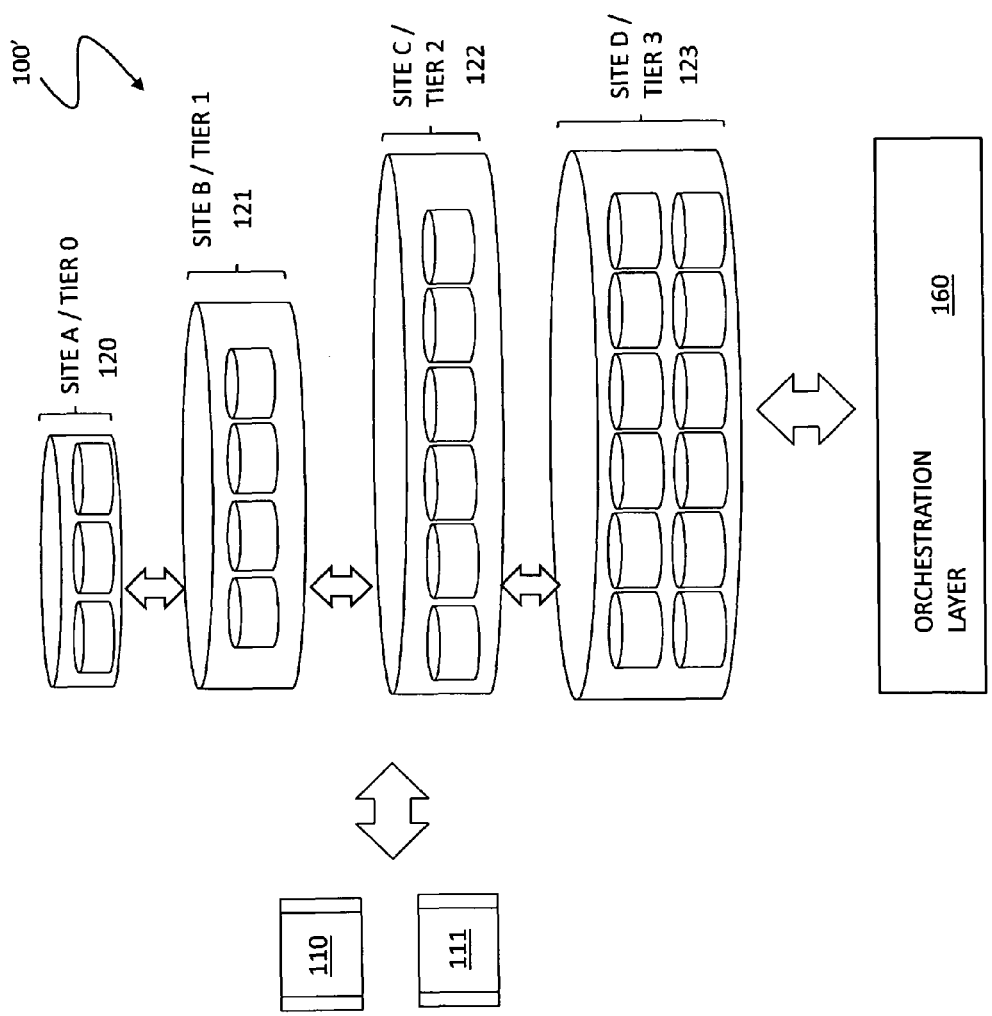
FIG. 3 is a schematic illustration showing a distributed storage system with cloud tiering according to another embodiment of the system described herein.

FIG. 3 is a schematic illustration showing a distributed storage system 100' with cloud tiering according to another embodiment of the system described herein. Multiple compute sites, including the sites A, B 120, 121 as well as sites C, D 122, 123, are illustrated and may be considered as tiers 0, 1, 2, 3 within a cloud computing configuration that may handle different I/O requests received from the hosts 110, 111 that are passed to the tiers 0-3 with the servicing of the I/O requests being orchestrated by the orchestration layer 160 according to one or more policies. As illustrated, the sites A-D 120-123 may have different processing characteristics and/or available resources; however, in other embodiments, the sites A-D may be substantially the same but for geographic location. In an embodiment, the designation of tiers at specific sites may be rotated, and/or otherwise periodically modified, for example, based on different times of the day. That is, for example, a site designated as tier 0 may be a preferred site for processing in a cloud computing environment during a preferred local time, such as in the middle of the night, but become later designated as a different tier, for example tier 3, during a busy processing time in the middle of the day. In other embodiments according to the system described herein, tiers 0-3 may correspond to a type of resource. For example, tier 0 may correspond to a fast and easily accessible storage resource, such as flash memory, and tier 3 may correspond to inexpensive/large capacity memory. Other types of processing characteristics for tier designation may also be used in connection with the system described herein.

Figure 4:
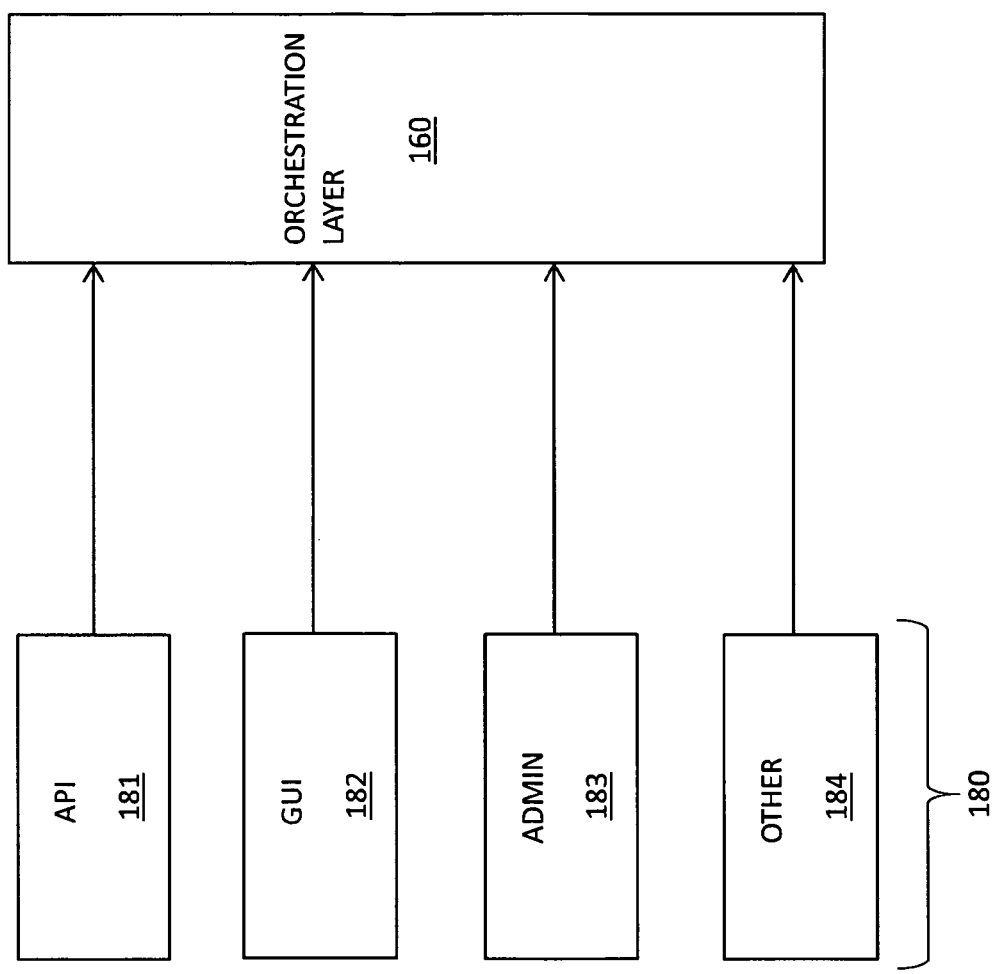
FIG. 4 is a schematic illustration showing inputs to the orchestration layer in connection with controlling the passing of I/O requests to one or more compute sites and based on one or more policies implemented by the orchestration layer according to an embodiment of the system described herein.

FIG. 4 is a schematic illustration showing inputs to the orchestration layer 160 in connection with controlling the servicing of I/O requests at one or more compute sites and based on one or more policies implemented by the orchestration layer 160 according to an embodiment of the system described herein. In various embodiments, inputs to the orchestration layer 160 may include inputs 180 from one or more application program interfaces (APIs) 181, graphical user interfaces (GUI) 182, administrator inputs 183 directly to the orchestration layer and/or other input mechanisms 184. The inputs 180 may be used to embed business rules, SLA's, and/or policies into the orchestration layer 160. For example, the API 181 may include information automatically provided from a utility facility with rate schedule information, such as a utility rate schedule information, concerning utility rates for different times of the day, week, month etc.

In another embodiment, the GUI 182 may provide information obtained from at one or more of the compute sites 120-123 and/or from one or more of the hosts 110, 111 with input information obtained from one or more users. The inputs 180 may reflect specific information corresponding to service legal agreements (SLAs) with respect to service agreements for one or more customers and service providers. The orchestration layer 160 may maintain and update various types of policies for controlling and/or otherwise governing processing requirements, such as requirements of a particular SLA, load balancing requirements, requirements of minimizing processing costs and/or maximizing processing speed for one or more I/O requests and/or other processing considerations. In various embodiments, the orchestration layer 160 may include a policy engine that makes determinations driven by business policies, SLAs, performance requirements, utility or other rate schedules and/or other appropriate type of dynamic service input or dynamic triggers to execute various orchestration events.

The orchestration layer 160 may be used to control selection of compute sites for the servicing of I/O requests according to the one or more policies and based on the inputs 180 to the orchestration layer 160. In an embodiment, the distributed layer 150 of one or more of the compute sites 120-123 may determine an appropriate one of the compute sites 120-123 to handle any particular I/O request based on the policy and/or other information maintained by the orchestration layer 160 and route the I/O request to the appropriately determined compute site. The system described herein provides a system that may respond to a particular level of activity at one or more of the compute sites 120-123. For example, a burst of data processing requests may occur for a particularly high usage period in the middle of the day for one or more of the compute sites (e.g., compute site 120). Accordingly, routing of I/O requests to one or more of the other computes sites (e.g., compute sites 121-123) may be controlled using the orchestration layer 160 in response to a burst period.

According to an embodiment of the system described herein, each of the computes sites may be geographically distant from other of the compute sites. Thus, for example, based on a policy that dictates processing at compute sites having a local time in the middle of the night (e.g., a time tier of 1:00 am to 4:00 am), for which processing activity may be low and/or processing resources may be inexpensive, the orchestration layer 160 may provide policies and maintain information, such as utility rate information, to control the passing of at least some of the I/O requests to compute sites having a local time within the desired time tier. Since the compute sites may, for example, be geographically dispersed world-wide, as time passes, different sites may enter the desired time window tier, thereby becoming a preferred compute site (e.g., becoming, for example, a tier 0 compute site), while other compute sites located geographically elsewhere may exit the desired time window tier and be designated a less preferred compute site (becoming, for example, a tier 1 or other tier compute site). The orchestration layer 160 keeps track of this information and/or other policy requirements which is used to route I/O requests accordingly among the compute sites 120-123.

In various embodiment, there may be three main categories of input feed types provided by the inputs 180 that are implemented by the orchestration layer 160. One input feed type may include static information for which I/O requests are routed according to specific information, for example, specific time and location based information and/or processing characteristic requirements. A second input feed type may static/dynamic information for which I/O requests are routed according to specific business policy and/or SLAs, for example. Once this input is received, the system described herein may dynamically interact across geographies to determine what actions to take based upon the initial static entry. A third input feed type may be fully dynamic for which the inputs are dynamic and fed from other automated inputs. For example, a fully dynamic input may be a utility rate schedule that triggers various behaviors in the system described herein. Another example may be a retail billing system feeding information triggering various behaviors in the system described herein to accommodate application needs.

In other embodiments, various ones of the computes sites 120-123 may have specific processing characteristics, such as a site with predominantly fast flash memory or large capacity/inexpensive memory and/or other processing capabilities that designates that site at a particular tier level according to a policy implemented by the orchestration layer 160. For example, an SLA for a particular customer may require processing at a specified resource criteria. Such policy information may be maintained by the orchestration layer 160, and I/O requests may be routed to appropriate compute sites that meet the requirements of the policy for the particular SLA. As discussed elsewhere herein, other types of policies may be used in accordance with the system described herein based on any appropriate criteria.

Figure 5:
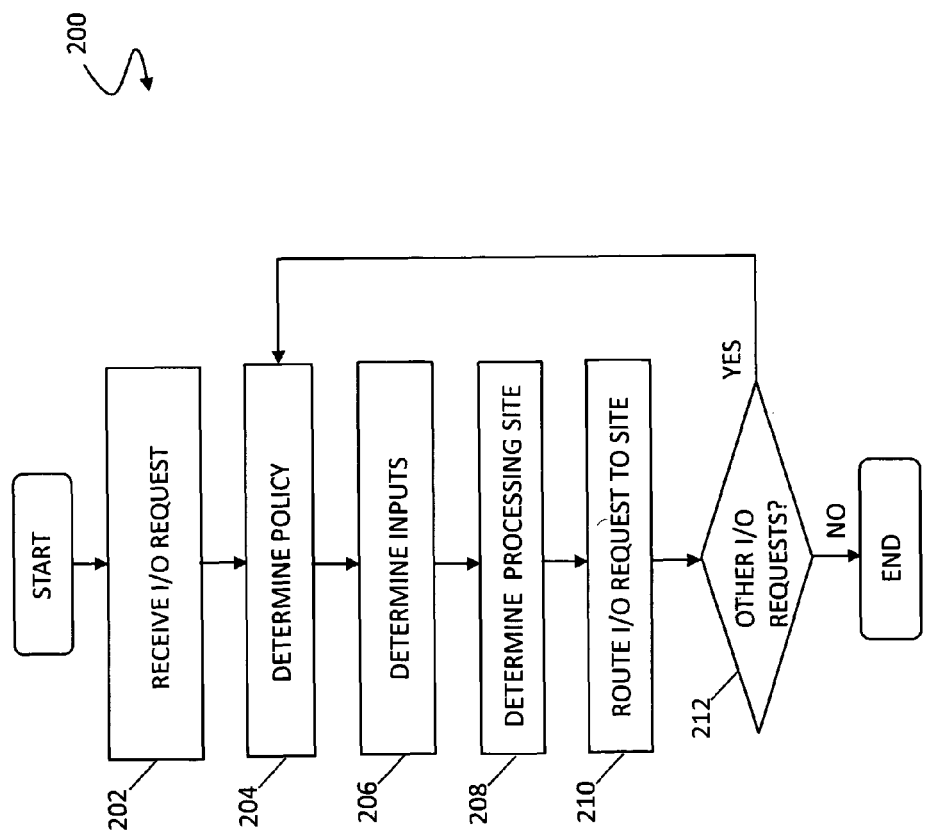
FIG. 5 is a flow diagram showing cloud tiering processing using an orchestration layer in a distributed storage system, like the distributed storage system 100/100', according to an embodiment of the system described herein.

FIG. 5 is a flow diagram 200 showing cloud tiering processing using an orchestration layer in a distributed storage system, like the distributed storage system 100/100', according to an embodiment of the system described herein. At a step 202, an I/O request is received from a host. For example, the I/O request may be received at a particular one of the compute sites 120-123. After the step 202, processing proceeds to a step 204 where a policy maintained by the orchestration layer 160 is determined that corresponds to the servicing of the I/O request. After the step 204, processing proceeds to a step 206 where the orchestration layer 160 determines information received from one or more inputs that corresponds to the policy affecting processing of the I/O request.

After the step 206 processing proceeds to a step 208 one or more sites from among the cloud configuration of sites, like the sites 120-123, is determined as suitable to service the I/O request according to the policy and the input information maintained by the orchestration layer 160. For example, in an embodiment, the policy and inputs may correspond to preferred servicing of the I/O request at a site having a local time in the middle night where processing activity and/or cost is low, and the orchestration layer 160 may determine the appropriate site in a tier that is presently within the desired time window. After the step 208, processing proceeds to a step 210 where the I/O request is routed to the appropriate site for servicing based on the policy and/or other information maintained by the orchestration layer 160. In various embodiments, a distributed layer, like the distributed layer 150 discussed elsewhere herein, may control the routing of the I/O request among the compute sites 120-123 based on the policy and/or other information maintained at the orchestration layer 160. After the step 210, processing proceeds to a test step 212 where it is determined whether other I/O requests at to be routed according to the system described herein. If so, then processing proceeds back to the step 204. If not, then processing is complete.

FIG. 6 is a flow diagram 300 showing policy and input processing by the orchestration layer 160 according to an embodiment of the system described herein. At a step 302, the orchestration layer 160 receives and stores information for a policy concerning the processing of particular I/O requests. For example, in an embodiment, the policy may concerning the desired processing of I/O requests in particular a local time windows of a compute site. In other embodiments, as discussed elsewhere herein, the policy may concern a business policy and/or an SLA of one or more customers in connection with the processing of I/O requests. After the step 302, processing proceeds to a step 304 where the orchestration layer 160 receives and stores input information that may be used by the orchestration layer 160 in connection with processing I/O requests. As further discussed elsewhere herein, inputs may include static and/or dynamic inputs from one or more interfaces, either manually or automatically, and include inputs such as utility rate tables, business policy factors, SLA requirements, etc. It is noted that, in various embodiments, the order of steps 302 and 304 may be modified from that discussed above and/or the steps 302 and 304 may be combined into one step. After the step 304, processing is complete.

It should be noted that, according to an embodiment of the system described herein, the compute sites servicing I/O requests may be transparent to the requesting host. That is, the host may not be aware that different ones of the computes sites, at different geographical locations, are processing the host's I/O requests.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for managing I/O request processing comprising:
   receiving an I/O request;
   maintaining policy information at an orchestration layer that is coupled to a plurality of compute sites that service I/O requests, wherein the policy information affects servicing of the I/O request, wherein the orchestration layer receives at least one input concerning processing resources of the plurality of compute sites;
   determining, at the orchestration layer, at least one of the plurality of compute sites, as a selected compute site, to service the I/O request, wherein the selected compute site is determined based on the policy information maintained at the orchestration layer and based on the at least one input received by the orchestration layer, wherein the input includes processing characteristics of the processing resources of the plurality of computes sites based on when processing resources are accessed, and wherein the policy information includes information concerning desired processing characteristics for processing the I/O request; and
   orchestrating, at the orchestration layer, servicing of the I/O request at the selected compute site, wherein the policy information includes information corresponding to a service level agreement between a customer and a service provider, and wherein the at least one input includes rate information of processing costs for processing at specific times for the processing resources at the plurality of compute sites.

2. The method according to claim 1, wherein at least one of: the policy information and the at least one input include dynamically updated information.

3. The method according to claim 1, wherein the plurality of compute sites are located geographically distant from each other.

4. The method according to claim 3, wherein determining the selected compute site to service the I/O request includes basing the determining on policy information of the service level agreement that identifies a desired processing characteristic as processing at a local time at the selected compute site.

5. The method according to claim 1, wherein servicing of the I/O request at the selected compute site is transparent to a host that sends the I/O request.

6. The method according to claim 1, further comprising:
   receiving at least one of: the policy information or the at least one input at the orchestration layer from an interface.

7. The method according to claim 6, wherein the interface includes at least one of: an application programming interface or a graphical user interface.

8. A non-transitory computer readable medium storing computer software for managing I/O request processing, the computer software comprising:
   executable code that receives an I/O request;
   executable code that maintains policy information at an orchestration layer that is coupled to a plurality of compute sites that service I/O requests, wherein the policy information affects servicing of the I/O request, wherein the orchestration layer receives at least one input concerning processing resources of the plurality of compute sites;
   executable code that determines at the orchestration layer, at least one of the plurality of compute sites as a selected compute site, to service the I/O request, wherein the selected compute site is determined based on the policy information maintained at the orchestration layer and based on the at least one input received by the orchestration layer, wherein the input includes processing characteristics of the processing resources of the plurality of computes sites based on when processing resources are accessed, and wherein the policy information includes information concerning desired processing characteristics for processing the I/O request; and executable code that orchestrates, at the orchestration layer, servicing of the I/O request at the selected compute site, wherein the policy information includes information corresponding to a service level agreement between a customer and a service provider, and wherein the at least one input includes rate information of processing costs for processing at specific times for the processing resources at the plurality of compute sites.

9. The non-transitory computer readable medium according to claim 8, wherein at least one of: the policy information or the at least one input includes dynamically updated information.

10. The non-transitory computer readable medium according to claim 8, wherein the plurality of compute sites are located geographically distant from each other.

11. The non-transitory computer readable medium according to claim 10, wherein the executable code that determines the selected compute site to service the I/O request includes executable code that bases the determination on policy information of the service level agreement that identifies a desired processing characteristic as processing at a local time at the selected compute site.

12. The non-transitory computer readable medium according to claim 8, wherein servicing of the I/O request at the selected compute site is transparent to a host that sends the I/O request.

13. The non-transitory computer readable medium according to claim 8, further comprising:

executable code that receives at least one of: the policy information or the at least one input at the orchestration layer from an interface.

14. The non-transitory computer readable medium according to claim 13, wherein the interface includes at least one of: an application programming interface or a graphical user interface.

15. A system for managing I/O request processing, comprising:

a plurality of compute sites that are connected; and an orchestration layer that is coupled to the plurality of compute sites, wherein the orchestration layer includes a computer readable medium storing computer software for managing I/O request processing, the computer software including:

executable code that maintains policy information at the orchestration layer, wherein the policy information affects servicing of an I/O request received for processing at the plurality compute sites, wherein the orchestration layer receives at least one input concerning processing resources of the plurality of compute sites;

executable code that determines, at the orchestration layer, at least one of the plurality of compute sites, as a selected compute site, to service the I/O request, wherein the selected compute site is determined based on the policy information maintained at the orchestration layer and based on the at least one input received by the orchestration layer, wherein the input includes processing characteristics of the processing resources of the plurality of computes sites based on when processing resources are accessed and wherein the plurality information includes information concerning desired processing characteristics for processing the I/O request; and executable code that orchestrates, at the orchestration layer, servicing of the I/O request at the selected compute site, wherein the policy information includes information corresponding to a service level agreement between a customer and a service provider, and wherein the at least one input includes rate information of processing costs for processing at specific times for the processing resources at the plurality of compute sites, and wherein the executable code that determines the selected compute site to service the I/O request includes executable code that bases the determination on policy information of the service level agreement that identifies a desired processing characteristic as processing at a local time at the selected compute site.

16. The system according to claim 15, wherein the plurality of compute sites are located geographically distant from each other.

17. The system of claim 15, wherein the computer software of the orchestration layer further includes:

executable code that receives at least one of: the policy information or the at least one input at the orchestration layer from an interface.

* * * * *